Jan. 10, 1928.
H. A. HICKS
1,655,698
AIRPLANE RUDDER CONTROL
Filed Dec. 27, 1926
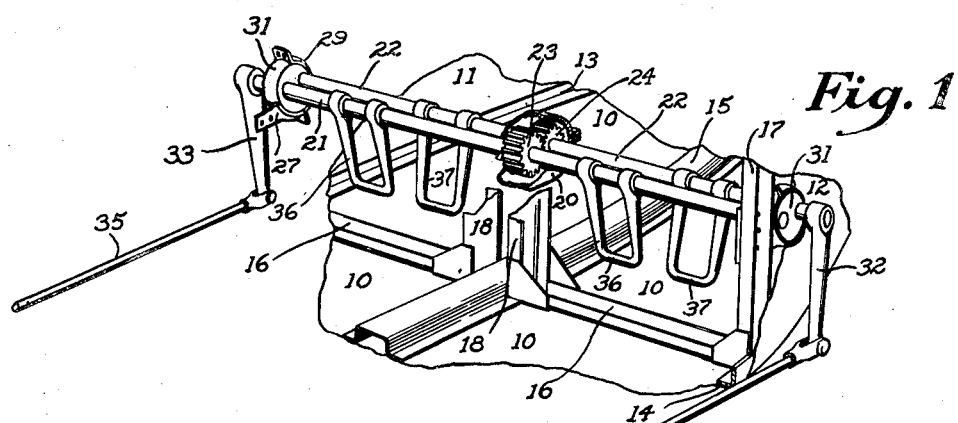
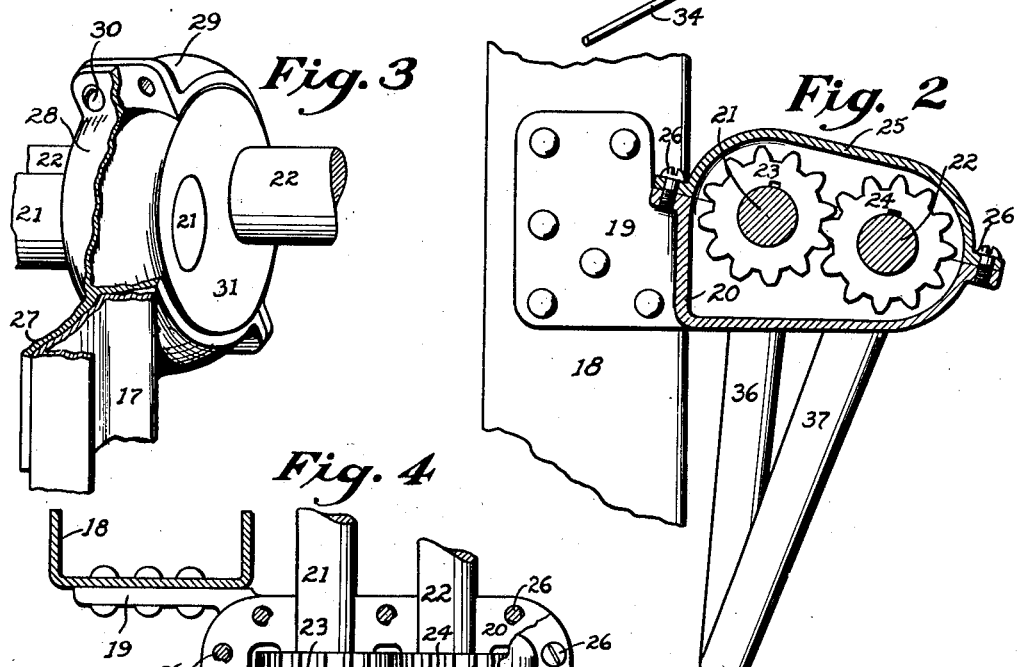
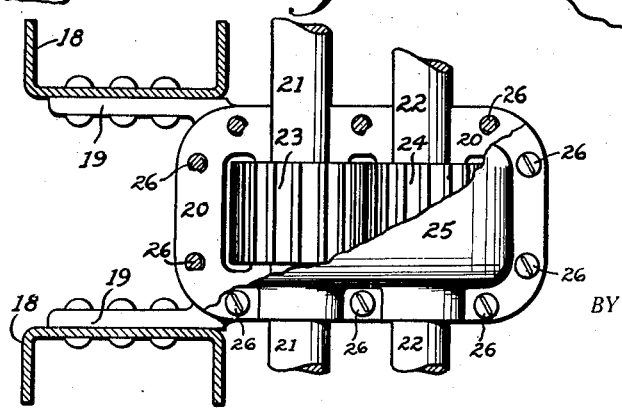
INVENTOR.
Harold A. Hicks,
BY
ATTORNEY.

Patented Jan. 10, 1928.

1,655,698

UNITED STATES PATENT OFFICE.

HAROLD A. HICKS, OF DETROIT, MICHIGAN, ASSIGNOR TO FORD MOTOR COMPANY, OF DETROIT, MICHIGAN.

AIRPLANE-RUDDER CONTROL.

Application filed December 27, 1926. Serial No. 157,340.

The object of my invention is to provide an airplane rudder control of simple, durable, and inexpensive construction.

A further object of my invention is to provide an airplane rudder control which may be in the form of a unit which is readily attachable and detachable to and from the fuselage of the airplane.

A further object of my invention is to provide such a control that the pilot's feet will not readily become separated from the controls by accident, and which is readily engageable by the pilot's feet so that the operation of the rudder by the pilot may be easier and more automatic.

Still a further object of my invention is to provide an airplane rudder control of certain simple construction which may be operated by either of two pilots and which will minimize the possibility that a student pilot can counteract the action of an experienced pilot in properly controlling a plane.

Still a further object of my invention is to provide an airplane rudder control having a pair of adjacent parallel shafts geared together to rotate in opposite directions and provided with foot receiving stirrups so that pressure on these stirrups may operate the shafts to in turn operate the rudder controls.

Still a further object of my invention is to provide in combination with such a controlling device means for mounting the same which will prevent the warping or weaving of the fuselage from affecting the operation of the control members.

With these and other objects in view my invention consists in the combination, construction, and arrangement of the various parts of my improved device as described in the specifications, claimed in the claims, and disclosed in the accompanying drawings, in which Fig. 1 shows a perspective portion of a fuselage having my improved control device installed therein.

Fig. 2 shows an enlarged vertical transverse sectional view through the gear casing which connects the operating shafts of my device together.

Fig. 3 shows an enlarged detailed perspective view, parts being broken away to better illustrate the construction of the means for mounting the ends of the shafts of my improved rudder control, and Fig. 4 shows a top or plan view of the gear casing shown in Fig. 2, the parts being broken away to better illustrate the operation.

Referring to the accompanying drawings, I have used the reference numeral 10 to indicate generally the floor or bottom of the fuselage having side walls 11 and 12 at either edge thereof. Longérons 13, 14, and 15 extend along the edges and central portions respectively of the floor 10. These longérons are connected by struts 16 which in turn are connected to vertical struts 17 of which only one is here illustrated. Fuselage constructions of this or similar types are well known in the manufacturing art and further description of the fuselage parts will not be given herein as my improved control device may be installed in any fuselage which is similarly or sufficiently braced.

It will no doubt be understood that heretofore the airplanes with which I have been familiar have had their rudders controlled by a bar which has been pivoted intermediate to its ends to swing in a horizontal plane slightly above the floor of the fuselage, and the ends of this bar have been connected to wires which extend over pulleys and along the fuselage to the rudder control struts. This construction was open to the objection that the pilot's feet tend to slip off from this bar when it was moved to extreme positions, warping or weaving of the fuselage would affect operation thereof, and dual controls made involved and complicated constructions necessary which were likely to get out of order. My improved rudder control device avoids the objection mentioned and has the further advantage of being easily removed for replacement or repairs when necessary.

Adjacent to the central longéron 15 a pair of spaced parallel vertical brackets 18 are secured to the struts 16 and longéron 15 and extend upwardly to a position so that the ears 19 of a gear box 20 may be secured thereto.

Mounted in this gear box 20 are a pair of spaced parallel horizontal shafts 21 and 22 which have gears 23 and 24 secured thereto within the gear box. These parts are so arranged that the gears 23 and 24 will prevent the shafts 21 and 22 from moving longitudinally through the gear box 20. A cover member 25 is detachably secured to the gear box 20 by screws 26 so that the cover 25 may form the upper half of the bearings for the shafts 21 and 22 and therefore permit these shafts to be removed from the gear box by being merely lifted out when the cover 25 is removed.

The vertical struts 17 have divided bearing brackets secured thereto by ears 27 which extend from these bearing brackets. The main member of the bearing bracket member 28 has a cap member 29 adjustably secured thereto as by bolts or screws 30.

The shafts 21 and 22 extend to a position adjacent to these brackets and at that place are journalled in a bearing block 31 which has a spherical outer surface designed to correspond with a correspondingly shaped inner surface of the bearing members 28 and 29. It will be seen that this universal mounting of the bearing block at the end of the shafts 21 and 22 will prevent their operation from being affected by the ordinary warping or weaving of the fuselage construction.

The shaft 22 is extended through the bearing block 31 at one end of my improved device so that an operating arm 32 may be secured thereto. The shaft 21 is similarly extended through the bearing block 31 at the opposite end of the device so that a second arm 33 may be secured thereto. The ends of these operating arms 32 and 33 are adjustably and pivotally connected to operating wires or rods 34 and 35 which extend rearwardly from this rudder control device to the controlling struts which project from the rudder. Of course these rods or wires 34 and 35 may be suitably guided along the fuselage by any of the well known methods for this purpose.

When it is desired to remove the device from the fuselage for any reason the caps 29 and cap 25 may be removed which permits the bearing blocks 31 and the gears 23 and 24 to be slid out of the bearings and gear box respectively by a lateral and upward movement. A portion of the side walls 11 and 12 of the fuselage adjacent to the universal bearings may be cut away sufficiently so that the shafts 21 and 22 may be first slid lengthwise so that one end thereof may be lifted and then so that the shafts may be slid out of the opening at the other side of the fuselage so that they may then be removed from the fuselage. This clearance opening in the side walls 11 and 12 may be of sufficient size to permit the arms 32 and 33 to be removed with shafts 21 and 22 or the clearance openings may be smaller so that arms 32 and 33 must first be removed before these shafts are removed from their position. In any event control rods or wires 34 or 35 must be disconnected from these shafts before they can be removed.

In the practical operation of my improved device, it will be seen that the parts are assembled in the position shown in Fig. 1. The pilot while seated to the rear of this shaft may place his feet in stirrups 36 and 37 which are mounted respectively on the shafts 21 and 22. Due to the gear connection between these shafts a pressure of the stirrups 36 will cause the shaft 21 to rotate in one direction and the shaft 22 to rotate in the opposite direction. The shafts will have the same action but will rotate in a reverse direction if the stirrup 37 is pressed upon. Movement of these shafts 21 and 22 in opposite directions will swing the arms 32 and 33 in opposite directions thereby operating the control rods or wires in opposite directions which is the proper movement for controlling airplane rudders as they are now usually constructed.

In the form of device here illustrated I have shown these stirrups 36 and 37 secured to the shafts 21 and 22 at both sides of the gear box 20 so that either of two pilots may operate the rudder control simultaneously. In this connection it will be noted that the action of these stirrups 36 and 37 is so positive that if a student pilot should become nervous or ill, then the instructor will ordinarily be able to exert enough pressure to prevent any ill-advised action of the student.

Among the many advantages arising from my improved device it should be specifically pointed out that dual airplane rudder controls only require an additional pair of stirrups to be mounted on the operating shafts, and does not block the other controlling mechanism. Furthermore the warping or weaving of the fuselage construction will not materially affect operation of my improved control device. The control device is removable as a unit for replacement or repairs and the easy removal thereof makes it possible to remove this assembly for other necessary adjustments and repairs to adjacent parts of the airplane.

Some changes may be made in the construction and arrangement of the various parts of my improved device without departing from the spirit of my invention and it is my intention to cover by my claims such changes as may reasonably be included in the scope thereof.

I claim as my invention:

1. In an airplane fuselage construction having longérons at the center and sides thereof and vertical struts extended from said longérons, a gear box mounted on a vertical strut, a pair of parallel shafts detachably mounted in said gear box, gears within the gear box for connecting said shafts together bearing blocks adjacent to the ends of said shafts, means for mounting said bearing blocks on vertical side struts of the fuselage for universal movement, and actuating and actuated members mounted on each of said shafts.

2. In an airplane control device for a fuselage having central and side longérons with vertical struts extended upwardly from each of said longérons, a gear casing mounted on the central strut comprising a main and cap member, a pair of spaced parallel shafts extending through said gear casing between the cap and the main member, gears in said casing for connecting said shafts and causing them to operate in opposite directions, two-part bearing members mounted on each of the side vertical struts, bearing blocks, having the ends of the shafts journalled therein and having universal movement in said bearing bracket members, and actuated and actuating members mounted on said shafts, the parts being so arranged that the shafts may be readily removed from the fuselage by detaching the cap from the gear casing and separating the parts of the two-part bearing bracket members.

3. In an airplane fuselage construction having longérons at the sides thereof and vertical struts extended from said longérons, a pair of parallel shafts, bearing blocks adjacent to the ends of said shafts, means for mounting said bearing blocks on said side struts of the fuselage for universal movement, actuating and actuated members on each of said shafts, and means for operatively connecting said shafts to cause them to rotate in opposite directions.

HAROLD A. HICKS.